United States Patent [19]

Hishinuma

[11] Patent Number: 4,903,205
[45] Date of Patent: Feb. 20, 1990

[54] METHOD AND APPARATUS FOR DISPLAYING RADIATION IMAGE, AND METHOD AND APPARATUS FOR CALCULATING UNSHARP MASK SIGNAL USED FOR THE SAME

[75] Inventor: Kazuhiro Hishinuma, Kanagawa, Japan

[73] Assignee: Fuji Photo Film Co. Ltd., Japan

[21] Appl. No.: 918,961

[22] Filed: Oct. 15, 1986

[30] Foreign Application Priority Data

Oct. 15, 1985 [JP] Japan ................................ 60-229412
Oct. 15, 1985 [JP] Japan ................................ 60-229413

[51] Int. Cl.$^4$ ............................................. H04N 1/40
[52] U.S. Cl. .................................. 364/413.13; 382/6; 358/111
[58] Field of Search .................. 364/414; 382/6, 54, 382/62; 358/111, 166

[56] References Cited

U.S. PATENT DOCUMENTS

| | | | |
|---|---|---|---|
| 4,315,318 | 2/1982 | Kato et al. ........................ | 364/515 |
| 4,317,179 | 2/1982 | Kato et al. ........................ | 364/515 |
| 4,387,428 | 6/1983 | Ishida et al. ...................... | 364/414 |
| 4,538,179 | 8/1985 | Tsutomu et al. .................. | 358/166 |
| 4,559,557 | 12/1985 | Keyes et al. ....................... | 358/111 |
| 4,658,412 | 4/1987 | Finkler et al. ..................... | 378/99 |

*Primary Examiner*—Allen MacDonald

[57] ABSTRACT

In a system for displaying a radiation image by scanning a recording medium carrying a radiation image stored thereon and converting the image into an electrical signal, an unsharp mask signal Sus corresponding to a super-low frequency at each scanning point is detected, and an operation, expressed as $S' = Sorg + \beta(Sorg - Sus)$ where Sorg denotes an original image signal detected from the recording medium and $\beta$ denotes an emphasis coefficient, is conducted to perform an unsharp masking process for emphasizing frequency components above the super-low frequency. The unsharp mask signal Sus and/or the emphasis coefficient $\beta$ is continuously changed to display the image as a moving image. The unsharp mask signal Sus is changed by calculating a basic unsharp mask signal Sus for a basic unsharp mask at a predetermined scanning point, and calculating a different unsharp mask signal Sus at the predetermined scanning point by simple arithmetic averaging of the basic unsharp mask signals Sus for basis unsharp masks surrounding the basic unsharp mask.

19 Claims, 4 Drawing Sheets

METHOD AND APPARATUS FOR DISPLAYING RADIATION IMAGE, AND METHOD AND APPARATUS FOR CALCULATING UNSHARP MASK SIGNAL USED FOR THE SAME

BACKGROUND OF THE INVENTION

1. Field of the Invention

This invention relates to a method of displaying a radiation image for medical purposes or the like on a display device such as a cathode ray tube (CRT) by conducting an unsharp masking process on the radiation image, and an apparatus for carrying out the method. This invention also relates to a method of calculating an unsharp mask signal for use in the unsharp masking process, and an apparatus for carrying out the method.

2. Description of the Prior Art

When certain kinds of phosphors are exposed to a radiation such as X-rays, $\alpha$-rays, $\beta$-rays, $\gamma$-rays, cathode rays of ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to radiation passing through an object to have a radiation image of the object stored thereon, and is then scanned with stimulating rays which cause it to emit light in proportion to the stored radiation energy. The light emitted by the stimulable phosphor sheet upon stimulation thereof is photoelectrically detected and converted to an electrical image signal, which is processed to reproduce a visible image having an improved image quality, particularly high diagnostic efficiency and accuracy.

The aforesaid radiation image recording and reproducing system is very advantageous in that it is possible to obtain a visible radiation image suitable for viewing, particularly for diagnostic purposes, by photoelectrically reading out a radiation image stored on the stimulable phosphor sheet, conducting appropriate signal processing on the electrical image signal thus detected, and reproducing the visible radiation image on a recording material such as a photographic film or on a display device such as a CRT by use of the processed electrical signal.

As one of the methods of processing the electrical signal, an unsharp masking process method has been proposed as disclosed, for example, in U.S. Pat. No. 4,315,318.

In brief, the proposed method is characterized by obtaining an original image signal (electrical signal) Sorg by scanning a radiation image stored on a stimulable phosphor sheet with stimulating rays and photoelectrically reading out the radiation image, obtaining an unsharp mask signal Sus corresponding to a super-low frequency at each scanning point on the stimulable phosphor sheet, performing a signal conversion represented by the formula $$S' = Sorg + \beta(Sorg - Sus)$$

where $\beta$ denotes an emphasis coefficient, to emphasize the frequency components (frequency region) above the super-low frequency, and using the signal S' for the formation of a visible image.

The unsharp masking process method is very advantageous for enhancing the contrast of the image of an object such as a lung blood vessel, a bone end portion, a tumor or soft tissue, for improving diagnostic efficiency and accuracy, and for decreasing the disease oversight ratio.

However, the conventional method of displaying the visible image by conducting the unsharp masking process has drawbacks as described below.

Namely, when a visible image is displayed by conducting the unsharp masking process, the image has heretofore usually been output and displayed as a single still image on a film, a hard copy or a CRT. Therefore, on a single output image, the result obtained by emphasizing only one frequency region by only one emphasis coefficient is displayed.

However, appropriate values of the emphasized frequency region and the emphasis coefficient differ in accordance with the viewing purposes, particularly the diagnostic purposes, even in a single image. For example, in the case of a limb bone fracture, it is desired to emphasize a comparatively high frequency region and express the bone contour sharply to accurately diagnose the fracture line or the like. On the other hand, in order to diagnose inflammation of the soft tissue around the bone fracture, it is desired to emphasize a comparatively low frequency region.

Accordingly, in the case where diagnosis should be conducted by performing a plurality of unsharp masking processes under different conditions (different emphasized frequency regions and/or different emphasis coefficients) for a single image, there have heretofore been employed (1) a method of manually adjusting the unsharp masking process conditions, reproducing differently processed images one by one on films, hard copies or a CRT, and finding the optimal processing conditions, or (2) a method of displaying a plurality of differently processed images side by side on one film, one hard copy, or one or more CRTs, and using them for diagnosis.

However, with the conventional methods, a long time is required since the process is repeated by changing the processing conditions each time the process is conducted, and the cost becomes high since many films are consumed [particularly, in the case of method (1)]. Also, since the number of images reproduced at one time cannot be limitlessly increased, it is not always possible to display the necessary number of images at one time with the necessary variations of the unsharp masking process conditions [particularly, in the case of method (2)].

Thus in the case where a plurality of images subjected to the unsharp masking processes under different processing conditions are displayed, a need exists for efficiently displaying more processed images, thereby improving the diagnostic efficiency and accuracy and facilitating diagnosis.

SUMMARY OF THE INVENTION

The primary object of the present invention is to provide a radiation image displaying method wherein a plurality of processed images obtained by conducting the unsharp masking process on a single image under different processing conditions (different emphasized frequency regions and/or different emphasis coefficients) are displayed in a larger number and more efficiently, thereby improving the viewing efficiency and accuracy, particularly the diagnostic efficiency and accuracy, facilitating viewing, and diagnosis.

Another object of the present invention is to provide an apparatus for carrying out the radiation image displaying method.

A further object of the present invention is to provide a method of calculating an unsharp mask signal, which quickly calculates different unsharp mask signals and is particularly suitable for the case where the unsharp mask signal is changed sequentially and the unsharp masking process using the unsharp mask signal is conducted continuously.

A specific object of the present invention is to provide an apparatus for carrying out the method of calculating an unsharp mask signal.

The present invention provides a radiation image displaying method which comprises the steps of:

in the course of scanning a recording medium, reading out a radiation image recorded thereon, converting the read out image into an electrical signal, and displaying the radiation image as a visible image on a display device by use of an original image signal obtained as said electrical signal, (i) obtaining an unsharp mask signal Sus corresponding to a super-low frequency at each scanning point, conducting an operation represented by the formula $$S' = Sorg + \beta(Sorg - Sus)$$

where Sorg denotes said original image signal read out from said recording medium and $\beta$ denotes an emphasis coefficient, to perform an unsharp masking process for emphasizing frequency components (frequency regions) above said super-low frequency, and displaying the processed image, and (ii) continuously changing said unsharp mask signal Sus and/or said emphasis coefficient $\beta$ to display the image as a moving image.

The present invention also provides a radiation image displaying apparatus which comprises:

(i) an original image signal memory for storing an original image signal Sorg obtained by scanning a recording medium and reading out a radiation image stored thereon, (ii) an unsharp masking process unit for obtaining an unsharp mask signal Sus corresponding to a super-low frequency at each scanning point, and conducting an operation represented by the formula $$S' = Sorg + \beta(Sorg - Sus)$$

where $\beta$ denotes an emphasis coefficient, by use of said unsharp mask signal Sus, said emphasis coefficient $\beta$ and said original image signal Sorg stored in said memory to perform an unsharp masking process for emphasizing frequency components above said super-low frequency, (iii) a control unit for sequentially changing at least one of said unsharp mask signal Sus and said emphasis coefficient $\beta$, and activating said unsharp masking process unit to conduct said unsharp masking process using each of the changed values of said unsharp mask signal Sus and/or said emphasis coefficient $\beta$, and (iv) a display device for continuously displaying a plurality of images baed on the image signals S', which are obtained by conducting said unsharp masking process using the respective changed values of said unsharp mask signal Sus and/or said emphasis coefficient $\beta$, as a moving image.

The present invention further provides an unsharp mask signal calculating method for calculating different unsharp mask signals Sus for use in the course of scanning a recording medium, obtaining an original image signal Sorg at each scanning point, conducting an operation represented by the formula $$S' = Sorg + \beta(Sorg - Sus)$$

where Sus denotes an unsharp mask signal corresponding to a super-low frequency at each scanning point and $\beta$ denotes an emphasis coefficient, for each original image signal Sorg, to perform an unsharp masking process, and performing the unsharp masking process multiple times continuously using the different unsharp mask signals Sus sequentially, wherein the improvement comprises the steps of:

(i) setting a basic rectangular unsharp mask having a mask size of $N \times M$ where N and M respectively denote the number of scanning points and are arbitrary integers excluding 1, (ii) disposing said basic unsharp mask so that a predetermined scanning point is positioned at the center thereof, and calculating a basic unsharp mask signal Sus at said predetermined scanning point by simple arithmetic averaging of original image signals Sorg at all scanning points included in said basic unsharp mask, (iii) carrying out said calculation of said basic unsharp mask signal Sus at respective scanning points, and storing the respective basic unsharp mask signals Sus thus calculated, and (iv) performing subsequent calculation of a different unsharp mask signal Sus at said predetermined scanning point by conducting simple arithmetic averaging of the stored basic unsharp mask signals Sus for $\alpha 1 \times \alpha 2$ number of the basic unsharp masks within an unsharp mask having a mask size of $\alpha 1 N \times \alpha 2 M$ where $\alpha 1$ and $\alpha 2$ respectively denote an integer excluding 1, and repeating said subsequent calculation of the unsharp mask signal Sus multiple times by use of different values of $\alpha 1$ and $\alpha 2$.

The unsharp mask signal calculating method is carried out by an apparatus characterized by the provision of:

(i) a first operation device for, when a predetermined scanning point is positioned at the center of a rectangular basic unsharp mask having a mask size of $N \times M$ where N and M respectively denote the number of scanning points and are arbitrary integers excluding 1, calculating a basic unsharp mask signal Sus at said predetermined scanning point by simple arithmetic averaging of original image signals Sorg at all scanning points included in said basic unsharp mask, (ii) a memory for storing the respective basic unsharp mask signals Sus at respective scanning points calculated by said first operation device, (iii) a second operation device for reading the basic unsharp mask signals Sus for $\alpha 1 \times \alpha 2$ number of the basic unsharp masks within an unsharp mask having a mask size of $\alpha 1 N \times \alpha 2 M$, where $\alpha 1$ and $\alpha 2$ respectively denote an integer excluding 1, from said memory, and calculating a different unsharp mask signal Sus at said predetermined scanning point by simple arithmetic averaging of said read-out basic unsharp masks signals Sus, and (iv) a control unit for sending a command to said second operation device for sequentially changing the values of $\alpha1$ and $\alpha2$ and calculating the unsharp mask signals Sus at respective values of $\alpha1$ and $\alpha2$.

With the radiation image displaying method and apparatus in accordance with the present invention, in the course of performing the unsharp masking process for emphasizing the frequency components above a predetermined super-low frequency by conducting the operation expressed as $$S' = Sorg + \beta(Sorg\text{-}Sus)$$

and then displaying a visible image on the display device, the unsharp mask signal Sus and/or the emphasis coefficient is changed continuously, and unsharp mask-processed images based on the changed values of the unsharp mask signal Sus and/or the emphasis coefficient $\beta$ are continuously displayed one after another as a moving image on the display device. Therefore, it is possible to markedly improve the viewing efficiency and accuracy, particularly the diagnostic efficiency and accuracy, and to facilitate viewing, and diagnosis.

Specifically, since many unsharp mask processed images based on different unsharp mask signals Sus (emphasized frequency regions) and different emphasis coefficients $\beta$ are continuously displayed one after another as a moving image on the display device, it becomes possible for the radiologist to quickly pick out the optimal images necessary for viewing each anatomical portion of interest.

Also, since a plurality of processed images are continuously displayed as a moving image on a single display device, it is possible to quickly observe very many different processed images. Since it is unnecessary to adjust the processing conditions each time the unsharp masking process is conducted and reproduce different processed images one by one on films, hard copies or the CRT as in the conventional method, it beciomes possible to facilitate rapid diagnosis.

By "display device" as referred to herein is meant a device whose display screen can be switched at such a speed that the displayed imaged are visually sensed as a moving image, for example, a CRT device, a liquid crystal display device, an electrochromic dispay device, or a PLZT display device.

With the unsharp mask signal calculating method and apparatus in accordance with the present invention, the basic unsharp mask signal Sus for the basic unsharp mask having a mask size of $N \times M$, where N and M respectively denote an arbitrary integer excluding 1, is calculated at respective scanning points and stored. Thereafter, the unsharp mask signal Sus for an unsharp mask having a mask size of $\alpha1N \times \alpha2M$, where $\alpha1$ and $\alpha2$ respectively denote variables consisting of an integers excluding 1 is calculated by simple arithmetic averaging of $\alpha1 \times \alpha2$ number of the aforesaid basic unsharp mask signal Sus within the $\alpha1N \times \alpha2M$ sized mask.

In the case where calculation is conducted by using only the signal Sorg as in the conventional method, in order to calculate the signals Sorg for the $\alpha1N \times \alpha2M$ sized mask, it is necessary to add $\alpha1N \times \alpha2M$ number of signals Sorg and divide the sum by $\alpha1N \times \alpha2M$, and thus to carry out $\alpha1\alpha2MN+1$ calculations. However, with the method and apparatus of the present invention, it is only necessary that $\alpha1 \times \alpha2$ number of the basic unsharp mask signals Sus be added and the sum be divided by $\alpha1N \times \alpha2M$. Thus the necessary number of calculations is $\alpha1\alpha2+1$. Accordingly, the calculation time becoms short, and it is possible to quickly calculate different signals Sus sequentially.

DESCRIPTION OF THE PREFERRED EMBODIMENTS

Figure 1:
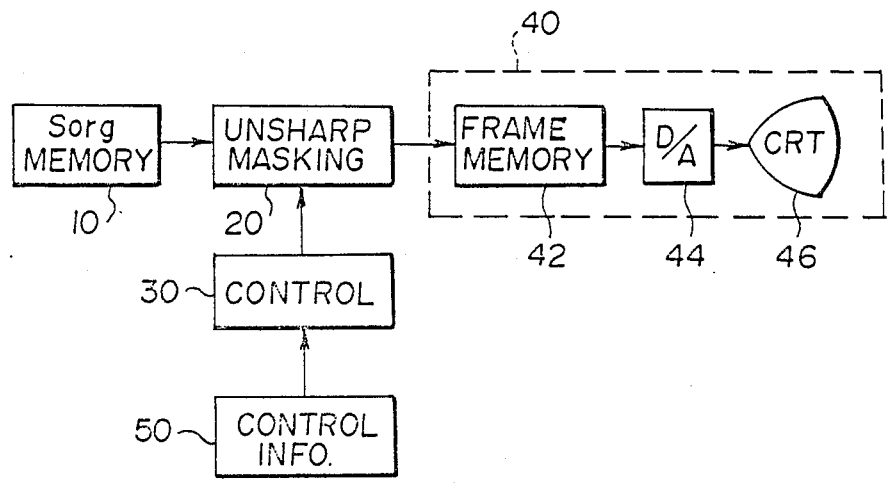
FIGS. 1 to 7 are block diagrams showing embodiments of the radiation image displaying apparatus in accordance with the present invention.

The present invention will hereinbelow be described in further detail with reference to the accompanying drawings.

In the radiation image displaying method and apparatus of the present invention, a radiation image is displayed as a visible image on a display device based on an electrical signal detected by scanning a recording medium and reading out the radiation image stored on the recording medium. Before the visible image is displayed, the read out electrical signal, i.e. the original image signal Sorg is subjected to an unsharp masking process.

The recording medium may be a stimulable phosphor sheet, an X-ray, film, or the like. In short, the recording medium may be of any type insofar as a radiation image can be recorded thereon and read out as an electrical signal by scanning thereof.

In the case of a stimulable phosphor sheet, the present invention is applied when the unsharp masking process is conducted on the original image signal Sorg in the course of exposing the stimulable phosphor sheet to radiation passing through an object to have a radiation image of the object stored thereon, scanning the stimulable phosphor sheet with stimulating rays such as a laser beam which cause the stimulable phosphor sheet to emit light in proportion to the stored radiation energy, photoelectrically detecting the emitted light using photomultiplier or the like, and reproducing a visible image on a display device such as a CRT by use of the detected electrical signals (original image signals Sorg).

In the case of X-ray film, the present invention is applied when an image recorded on the X-ray film is scanned with light, light transmitted through the X-ray film or light reflected thereby is photoelectrically detected and converted into an electrical signal by a photomultiplier, a CCD line sensor or the like, and a visible image is displayed on a display device such as the CRT by conducting the unsharp masking process on the electrical signals (original image signal Sorg).

In the unsharp masking process, an unsharp mask signal Sus corresponding to a super-low frequency at each scanning point is obtained, and an operation represented by the formula $$S' = Sorg + \beta(Sorg\text{-}Sus)$$

is conducted to emphasize frequency components above the super-low frequency.

By "an unsharp mask signal Sus corresponding to a super-low frequency" referred to herein is meant a signal representing the density at each scanning point of an unsharp image (herein referred to as the unsharp mask) obtained by blurring an original image so that it contains only frequency components lower than the super-low frequency. For the unsharp mask, it is possible to use a mask having a modulation transfer function of not less than 0.5 at a spatial frequency of 0.01 cycle/mm and not more than 0.5 at a spatial frequency of 0.5 cycle/mm, or an integrated value of the modulation transfer function with 0.001 at the lower end in the spatial frequency range of 0.01 to 0.5 cycle/mm constituted 90% of the integrated value of the modulation transfer function in the spatial frequency range of 0.001 to 10 cycle/mm.

The unsharp mask may be obtained by the following methods.

(1) The original image signal at every scanning point is stored and the memorized original image signals are read out together with the surrounding signals according to the size of the unsharp mask to obtain a mean value as the unsharp mask signal Sus. (The mean value may be a simple arithmetic mean or a weighted mean of various kinds.) In this method, the unsharp mask may be in the form of analog signals or in the form of digital signals after A/D conversion. Further, it is also possible to form the unsharp mask by transmitting the analog signal through a low pass filter in the main scanning direction and processing the signal in digital form in the sub-scanning direction.

(2) After the original image signal is read out using a light beam or the like having a small diameter, the signal at every scanning point is averaged and read out together with the surrounding signals by using a light beam having a larger diameter, matching the size of the unsharp mask. This is possible in the case where the recording medium is a stimulable phosphor sheet and radiation energy still remains on the stimulable phosphor sheet after the read out of the original image signal.

(3) This method is applicable to the case where the recording medium is a stimulable phosphor sheet, and utilizes the gradual expansion of the diameter of the scanning light beam which occurs due to scattering when the light beam passes through the stimulable phosphor layer. The original image signal Sorg is created using the light emission from the incident side of the stimulable phosphor layer, and the unsharp mask signal Sus is created using the light emission from the opposite side of the stimulable phosphor layer. In this case, the size of the unsharp mask can be controlled by changing the extent of the light scattering effect within the stimulable phosphor layer or by changing the size of the aperture used to receive the scattering light.

In the radiation image displaying method and apparatus of the present invention, when an image subjected to the unsharp masking process is displayed as a visible image on the display device, many images are displayed as a moving image by continuously changing the unsharp mask signal Sus and/or the emphasis coefficient $\beta$.

Specifically, the unsharp mask signal Sus and/or the emphasis coefficient $\beta$ is continuously changed within a range from a predetermined maximum value to a minimum value. (Continuous change includes the case where the value is changed continuously in the strict sense and the case where it is changed stepwise in small intervals.) The operation represented by the formula $S' = Sorg + \beta(Sorg - Sus)$ is conducted using the respective unsharp mask signals Sus and/or the respective emphasis coefficients $\beta$ thus changed. A plurality of processed images based on the results of these operations are continuously displayed on the display device, i.e. as a moving image. (Also in this case, "continuous display includes a display which is continuous in the strict sense and a display which changes at predetermined short intervals.)

Referring to FIG. 1, an embodiment of the radiation image displaying apparatus comprises an original image signal memory 10 for storing the unsharp mask signal Sus, and an unsharp masking process unit 20 for calculating the formula $S' = Sorg + \beta(Sorg - Sus)$ and performing the unsharp masking process to emphasize frequency components (frequency regions) above the super-low frequency corresponding to the unsharp mask signal Sus. The apparatus also comprises a control unit 30 for sequentially changing at least one or the other of the unsharp mask signal Sus and the emphasis coefficient $\beta$ and activating the unsharp masking process unit 20 to conduct the unsharp masking process using each of the changed values of the unsharp mask signal Sus and/or the emphasis coefficient $\beta$, and a CRT device 40 for continuously displaying a plurality of images based on the image signals S', which are obtained by repetitively conducting the unsharp masking process using the respective changed values of the unsharp mask signal Sus and/or the emphasis coefficient $\beta$, as a moving image.

It is necessary to input control information such as the mode (whether to change paramater Sus or $\beta$), the range of the variable parameter, the step size of the parameter change, and motion start or stop to the control unit 30. The control information may be entered manually or via a host computer. A control information input device 50 is provided in this embodiment for receiving control information entered either manually or from a host computer, converting the control information into a signal, and sending the signal to the control unit 30.

The CRT device 40 is provided with a frame memory 42 for storing the processed image signals S' for one image obtained by the unsharp masking process conducted in the unsharp masking process unit 20, a D/A converter 44 for D/A conversion of the signals received from the frame memory 42, and a CRT 46 for displaying a visible image using the signals received from the D/A converter 44. Specifically, the processed image signals S' based on the predetermined Sus or $\beta$ values are sequentially calculated at respective scanning points and are stored in the frame memory 42. When the calculation for one image is finished and all of the processed image signals S' for this one image are stored in the frame memory 42, the image is displayed as a visible image on the CRT 46. Thereafter, calculation and visible image display are effected in the same manner based on different unsharp mask signals Sus and/or different emphasis coefficients $\beta$. The visible images based on the respective unsharp mask signals Sus and/or the respective emphasis coefficients $\beta$ are very rapidly changed, and are perceived as a moving image.

This embodiment is advantageous in that the step size of the change in Sus and/or $\beta$ may be adjusted to any value. However, the image switching speed of the CRT 46 is limited by the operating speed of the unsharp masking process unit 20.

Figure 2:
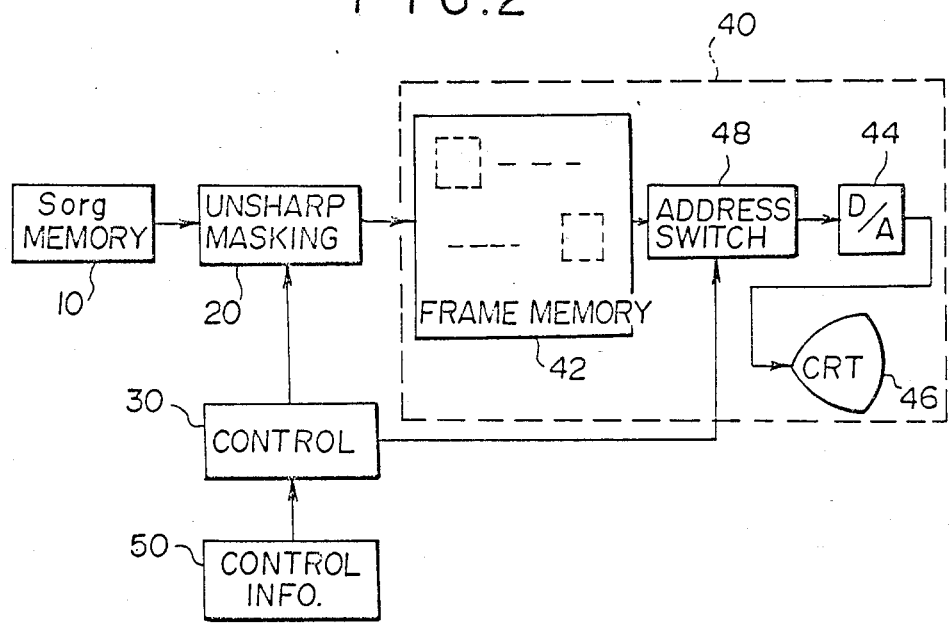

FIG. 2 shows another embodiment of the radiation image displaying apparatus. In this embodiment, the processed image signals for a plurality of images calculated by use of the respective values of Sus and/or β in the unsharp masking process unit 20 are stored in the frame memory 42, and the image displayed on the CRT 46 is switched by an address switching device 48 in units of sngle frames or several frames. The manner of address switching by the address switching device 48 is controlled by the control unit 30 on the basis of information entered from the control information input device 50. Otherwise the configuration is similar to that shown in FIG. 1.

In the embodiment of FIG. 2, it is possible to freely adjust the image switching speed of the CRT 46. However, the step size of the change in Sus or β or the like is limited by the storage capacity of the frame memory 42.

Figure 3:
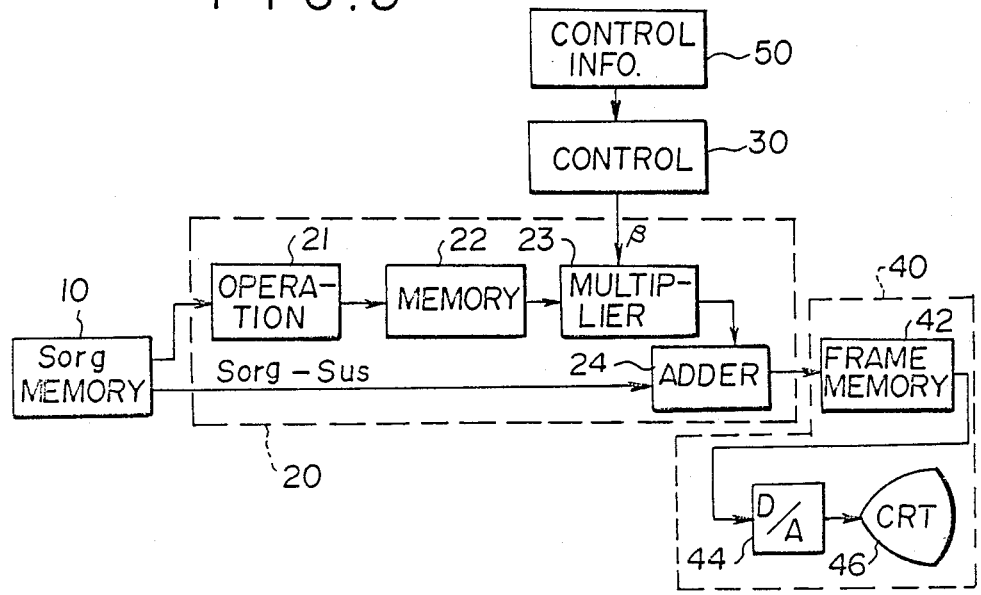

In a further embodiment of the radiation image displaying apparatus shown in FIG. 3, only the emphasis coefficient β is variable, unlike the embodiments of FIGS. 1 and 2 in which both Sus and β are variable. Specifically, in this embodiment, the unsharp masking process unit 20 comprises an operation device 21, a memory 22, a multiplier 23 and an adder 24. Since Sus is constant, an operation represented by the formula Sorg-Sus is first conducted by the operation device 21, and the calculated result is stored in the memory 22. Then, an operation represented by the formula β×(Sorg-Sus) is performed by the multiplier 23, an operation represented by the formula Sorg+β(Sorg-Sus) is carried out by the adder 24, and a visible image is displayed by the CRT device 40 in the same manner as described above based on the result of the calculation. The value of β is sequentially changed by the control unit 30 based on the control information entered from the control information input device 50, and a plurality of the images processed with the changing values of β are continuously displayed by the CRT device 40 as a moving image.

In the embodiment of FIG. 3, though Sus cannot be changed, it is possible to adjust the β-change step size to a small value. Also, when Sorg-Sus is calculated in advance and the result is stored in the memory 22, it is thereafter only necessary that the stored result be multiplied by β and added to Sorg. Therefore, it becomes possible to increase the image switching speed by the provision of the multiplier 23 and the adder 24.

Figure 4:
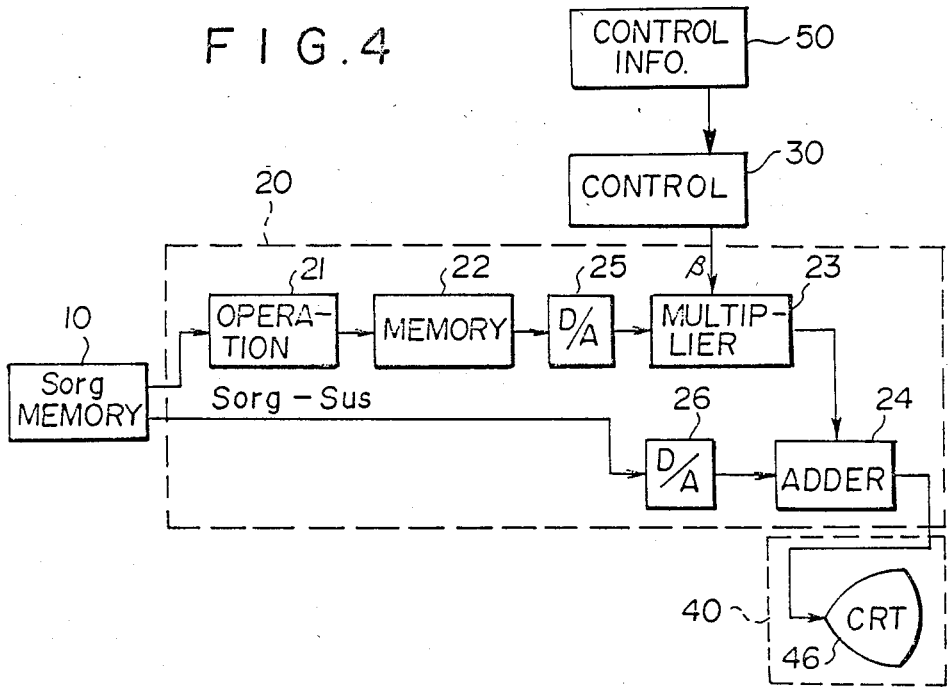

In a still further embodiment of the radiation image displaying apparatus shown in FIG. 4, the multiplication β×(Sorg-Sus) and the addition Sorg+β(Sorg-Sus) in the embodiment of FIG. 3 are conducted in analog form. For this purpose, D/A converters 25 and 26 are provided. (In this case, reference numeral 22 designates a frame memory.)

Figure 5:
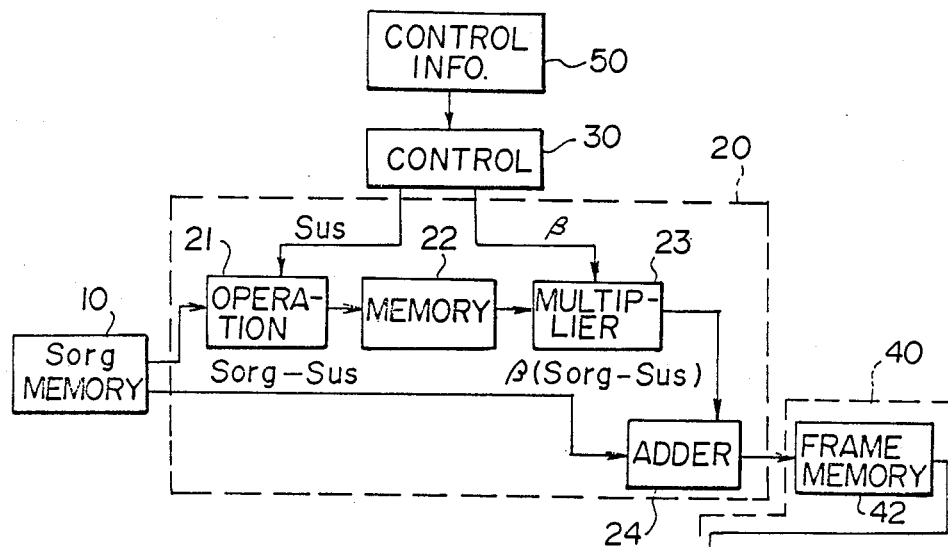

In another embodiment of the radiation image displaying apparatus shown in FIG. 5, both Sus and β are made variable. The configuration of the embodiment of FIG. 5 is similar to that of FIG. 3, except that the control unit 30 also sends the signal Sus to the operation device 21 in order to change Sus also.

With the embodiment of FIG. 5, the step sizes of Sus and β are not substantially limited, and the image switching speed related to changes in β is high, though the image switching speed related to changes of Sus is somewhat low.

Figure 6:
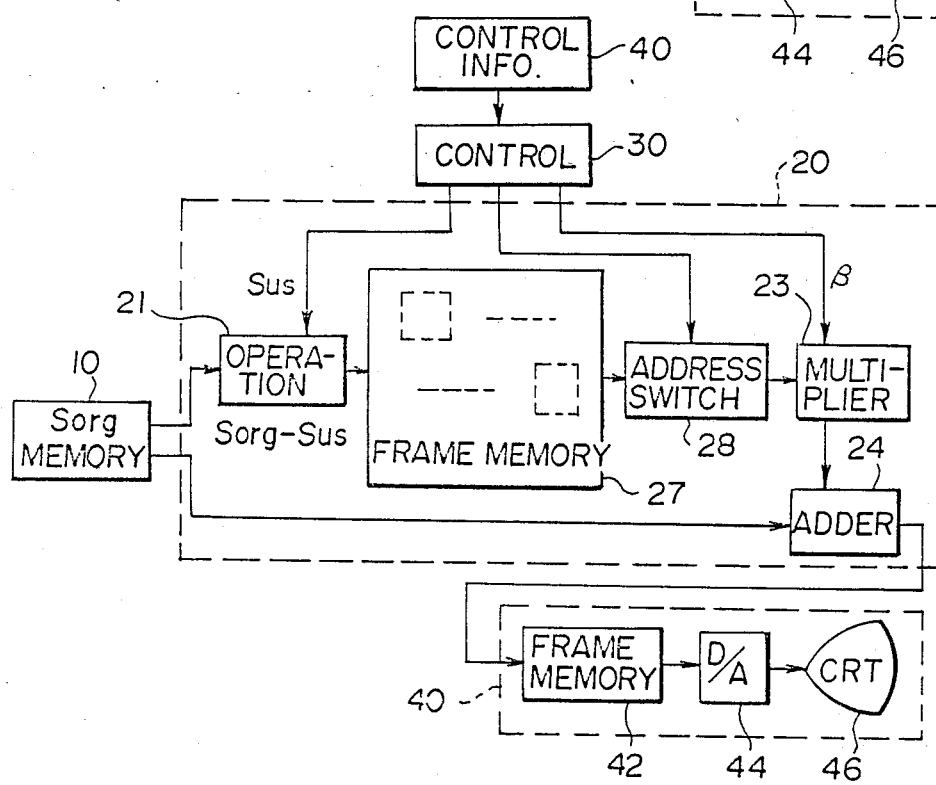

FIG. 6 shows a further embodiment of the radiation image displaying apparatus, which is constituted by incorporating the frame memory and the address switching device shown in FIG. 2 into the embodiment of FIG. 5. In this embodiment, the values of Sorg-Sus for one image obtained by calculations using the respective values of Sus are stored in a frame memory 27, and the image displayed on the CRT 46 is switched by the address switching device 28 in units of single frames or several frames. The value of β is also made variable.

With the embodiment of FIG. 6, the step size of β is not substantially limited, the image switching speed related to changes in β is high, and the image switching speed related to changes in Sus is freely adjustable. However, the Sus-change step size is limited by the storage capacity of the frame memory 27.

Figure 7:
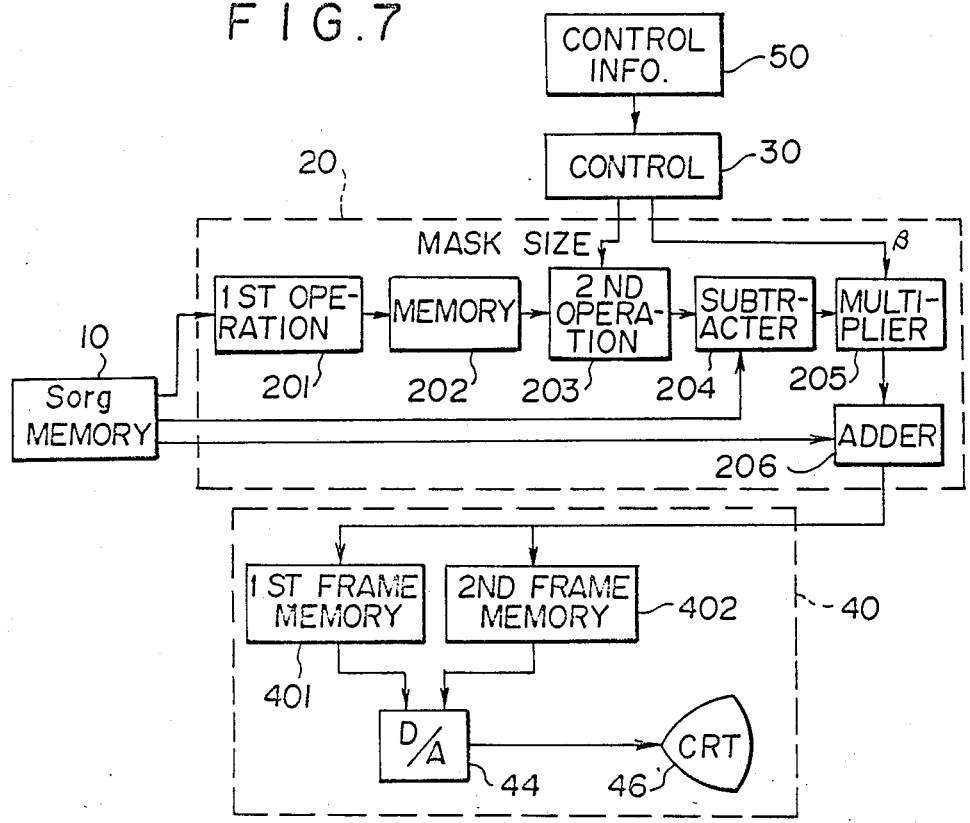

In a still further embodiment of the radiation image displaying apparatus shown in FIG. 7, both Sus and β are variable, the Sus-change step size is not limited to an unacceptable level, and the image switching speed related to changes in Sus is comparatively high. Thus this embodiment is very advantageous in practical use.

The embodiment of FIG. 7 is characterized particularly by the unsharp masking process unit 20 and the control unit 30, wherein an embodiment of the unsharp mask signal calculating apparatus in accordance with the present invention is employed.

In FIG. 7, the unsharp mask signal Sus at a predetermined scanning point is calculated by preparing a rectangular unsharp mask having an arbitrary size, reading out the original image signal Sorg at the predetermined scanning point and the original image signals Sorg at scanning points surrounding said predetermined scanning point from a memory in accordance with the size of the rectangular unsharp mask (the mask size is expressed by the lengths of two adjacent sides of the mask, and the length of each side is expressed by the number of the scanning points), and conducting simple arithmetic averaging of these signals. In other words, when the unsharp mask signal Sus at a predetermined scanning point is calculated, a rectangular unsharp mask having a predetermined size is prepared, and the original image signals Sorg at all scanning points included inside of the unsharp mask with the predetermined scanning point positioned at the center are subjected to simple arithmetic averaging.

In order to conduct the unsharp masking process multiple times and continuously using different unsharp mask signals Sus, it is necessary to very quickly calculate the different unsharp mask signals Sus at every scanning point. By "different unsharp mask signal Sus" is meant a different unsharp mask size then used for the calculation. Therefore, sequential calculation of different unsharp mask signals Sus at the predetermined scanning point requires sequentially changing the mask size in appropriately sized steps and within an appropriate range, and calculating Sus for the unsharp masks of the respective sizes.

An embodiment which calculates different unsharp mask signals Sus based on unsharp masks of appropriately stepped size is shown in FIG. 7, will hereinafter be described in detail.

The unsharp masking process unit 20 is provided with a first operation device 201 for calculating a basic unsharp mask signal Sus for a basic unsharp mask having a mask size of N×M, where N and M respectively denote an integer excluding 1, with N preferably denoting an odd number, and most preferably N=3, at every scanning point, and a memory 202 for storing the respective basic unsharp mask signals Sus. The unsharp masking process unit 20 is also provided with a second operation device 203 for calculating an unsharp mask signal Sus for a different mask size by arithmetic averaging of the respective unsharp mask signals Sus in accordance with a command received from the control unit 30, a subtracter 204 for conducting an operation represented by the formula Sorg-Sus between the signal Sus thus obtained and the original image signal Sorg, a multiplier 205 for carrying out the operation $\beta$(Sorg-Sus) by multiplying the output of the subtracter 204 by $\beta$, and an adder 206 for performing an operation expressed as Sorg+$\beta$(Sorg-Sus) by adding Sorg to the output of the multiplier 205.

The Sus calculating apparatus in accordance with the present invention is constituted by the first operation device 201, the memory 202, the second operation device 203, and the control unit 30.

In this embodiment, a square mask having a mask size of 3×3 is set as the basic unsharp mask, and the basic unsharp mask signal Sus at each scanning point is calculated by the first operation device 201 by use of the square mask.

Figure 8:
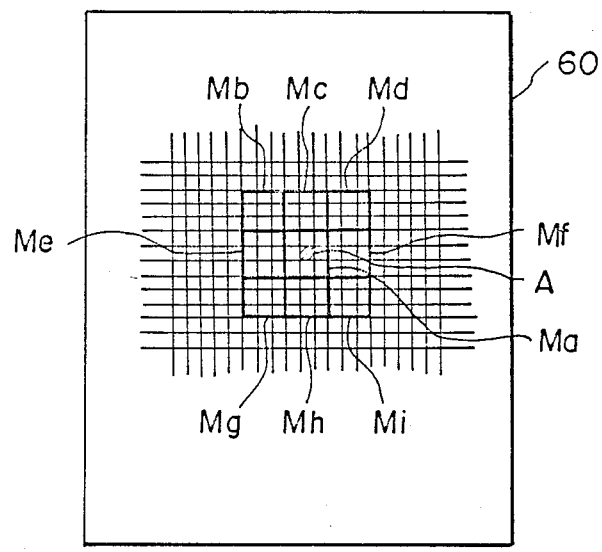
FIG. 8 is an explanatory view showing the method of calculating the unsharp mask signal Sus in the embodiment of FIG. 7.

FIG. 8 shows a stimulable phosphor sheet 60 as the recording medium, wherein each cell designates a single scanning point. For example, the basic unsharp mask signal Sus at a predetermined scanning point A in FIG. 8 is calculated by disposing a basic unsharp mask Ma having a mask size of 3×3 so that the predetermined scanning point A is positioned at the center of the basic unsharp mask Ma, and conducting simple arithmetic averaging of the original image signals Sorg at the nine scanning points included within the mask Ma. The signals Sorg at the respective scanning points are read out of the original image signal memory 10 and used for the calculation. In this manner, the basic unsharp mask signal Sus at each scanning point is calculated by the first operation device 201. the calculated signal Sus is stored in the memory 202. Also, the operation expressed as Sorg-Sus is conducted by the subtracter 204 by using the signal Sus. (The second operation device 203 is used thereafter for calculating different signals Sus for this point.) The result of calculation is processed by the multiplier 205 and the adder 206, and an unsharp masking processed image obtained by use of the basic unsharp mask signal Sus is displayed by the CRT device 40.

Calculation of different unsharp mask signals Sus at the predetermined scanning point A will now be described. Calculation of a different unsharp mask signal Sus requires calculating Sus based on an unsharp mask having a different size. In this embodiment, on the basis of the basic unsharp mask signal Sus for the basic unsharp mask having the mask size of N×M, unsharp mask signals Sus for unsharp masks having mask sizes of $\alpha 1N \times \alpha 2M$, where $\alpha 1$ and $\alpha 2$ respectively denote a variable consisting of an integer excluding 1, are calculated sequentially.

In this embodiment, the mask shapes are all square ($\alpha 1 = \alpha 2$). The mask size is changed 19 times in steps of odd number multiples of 3, with reference to the basic mask size 3×3, i.e. to 9×9, 15×15, 21×21, 27×27, ..., 111×111, and unsharp mask signals Sus for the respective mask sizes are calculated. The unsharp mask signal Sus for the mask size of 3×3 at each scanning point is stored in the memory 202 as mentioned above. An unsharp mask signal Sus for the mask size of 9×9 is calculated by simple arithmetic averaging of the nine unsharp mask signals Sus for 3×3 masks surrounding the original 3×3 most containing the point A. For example, in FIG. 8, the unsharp mask signal Sus for the mask size of 9×9 at the scanning point A is calculated by conducting simple arithmetic averaging of nine unsharp mask signals Sus for masks Ma to Mi, each having the 3×3 mask size, using the second operation device 203. Similarly, unsharp mask signals Sus for mask sizes 15×15, 21×21, ... are calculated by simple arithmetic averaging such 25, 49, ... of unsharp mask signals Sus stored in the memory 202.

Unsharp mask-processed images obtained based on the respective unsharp mask signals Sus thus calculated are alternately stored in a first frame memory 401 and a second frame memory 402, and are alternately read therefrom and displayed as visible images on the CRT 46 via the D/A converter 44. For example, while the processed image based on the unsharp mask signals Sus for the mask size of 3×3 is stored in the first frame memory 401 and displayed on the CRT 46, the processed image signals based on Sus values for the mask size 9×9 are written into the second frame memory 402. Then, the second frame memory 402 is connected to the D/A converter 44, and thus the image displayed on the CRT 46 is switched. The switching is conducted quickly and sequentially, and the images are displayed and perceived as a moving image.

Calculation of Sus values for different mask sizes in the second operation device 203 is performed based on a command received from the control unit 30. Specifically, the control unit 30 acts, for example, as described below.

First, in the case where Sus is changed, the control unit 30 receives information on the Sus change from the control information input device 50, and controls the mode. In this case, only Sus is changed, and the value of $\beta$ is fixed. Then, based on the conditions (e.g. the step size and range of Sus changes) designated to the control information input device 50, the control unit 30 calculates the necessary number of processes which should be conducted repeatedly, the mask sizes in the respective processes such as 3×3, 9×9, 21×21, ... 57×57, or the like. Thereafter, the control unit 30 receives a start signal from the control information input device 50, and activates the whole apparatus via synchronous lines. When the calculation and image display for the first mask size is finished, the next mask size is designated to the necessary sections of the apparatus, and the next calculation and image display processes are started. When the process has been repeated a predetermined number of times or when an image hold signal is received from the control information input device 50, the control unit 30 ceases processing, and the image displayed on the CRT 46 is held in the displayed condition.

In the case where $\beta$ is changed, complicated calculations as in the case where Sus is changed are unnecessary, and the value of $\beta$ used for multiplication in the multiplier 205 may merely be changed by the control unit 30 based on information on the step size or the like received from the control information input device 50.

In the aforesaid embodiment of FIG. 7, through N=3, N may also be any other integer excluding 1 and, may for example, be 2 or 5. In the case where N and M are equal to 1 and different unsharp mask signals Sus are calculated by changing $\alpha 1$ and $\alpha 2$, the calculation becomes equivalent to the calculation using the original image signal Sorg, and the calculation speed cannot be increased.

Also, in the embodiment of FIG. 7, α1 and α2 are equal to each other and are sequentially changed in the order 3, 5, 7, 9, . . . . However, α1 and α2 may be any other integers excluding 1, and may be changed in any manner. For example, they may be sequentially changed to alternate odd numbers in the order of 3, 7, 11, 15, . . . . The values of α1 and α2 should not be equal to 1 since the mask size then becomes equal to the basic unsharp mask. The maximum values and the minimum values of α1 and α2 may of course be adjusted to any values.

In this embodiment, Sus values are calculated as described above. Therefore, for example, when Sus for the mask size α1N×α2M is calculated, α1×α2 number of basic unsharp mask signals Sus may be added and the sum may be divided by α1N×α2M. Thus it is only necessary for a total of α1α2+1 calculations to be conducted and it becomes possible to quickly calculate different values of Sus.

In the calculation of Sus, the step size of the change in the mask size is limited to some extent. For example, in the aforesaid embodiment, calculation is possible only for masks having sizes which are odd number multiples of 3×3. However, where the unsharp masking process is conducted by sequentially changing Sus, for example, and the respective processed images are sequentially switched and displayed on the a CRT as a moving image for viewing purposes, particularly for diagnostic purposes, no problem arises in practice when the step size is of this order.

I claim:

1. A radiation image displaying method which comprises the steps of:

scanning a recording medium, reading out a radiation image recorded thereon, converting the read out image into an electrical image signal for each scanning point, processing said image signals, and displaying the radiation image as a visible image on a display device using said processed image signals, said processing step comprising;

(i) obtaining an unsharp mask signal Sus corresponding to a super-low frequency at each scanning point, conducting an operation represented by the formula $$S' = Sorg + \beta(Sorg - Sus)$$

where Sorg denotes the original image signal read out from said recording medium and $\beta$ denotes an emphasis coefficient, to perform an unsharp masking process for emphasizing frequency components above said super-low frequency and generate processed image signals, and (ii) continuously changing at least one of said unsharp mask signal Sus and said emphasis coefficient $\beta$ to continuously update said processed image signals, said displaying step comprising displaying a series of said processed image signals as a moving image.

2. A method as defined in claim 1 wherein said unsharp masking process comprises the step of providing an unsharp mask having a modulation transfer function of not less than 0.5 at a spatial frequency of 0.01 cycle/mm, and not more than 0.5 at a spatial frequency of 0.5 cycle/mm.

3. A method as defined in claim 1 wherein said unsharp masking process comprises the step of providing an unsharp mask wherein an integrated value of a modulation transfer function with 0.001 at the lower end in a spatial frequency range of 0.01 to 0.5 cycle/mm constitutes 90% of the integrated value of the modulation transfer function in the spatial frequency range of 0.001 to 10 cycle/mm.

4. A method as defined in claim 1 wherein said unsharp mask signal Sus is continuously changed by calculating further unsharp mask signals Sus using a calculation method comprising the steps of:

(a) setting a basic unsharp mask having a mask size of N×M where N and M denote the number of scanning points in two respective directions, N and M being arbitrary integers excluding 1, (b) disposing said basic unsharp mask so that a predetermined scanning point is positioned at the center thereof, and calculating a basic unsharp mask signal Sus at said predetermined scanning point by averaging the original image signals Sorg at all scanning points included in said basic unsharp mask, (c) calculating said basic unsharp mask signal Sus at respective scanning points, and storing the respective basic unsharp mask signals Sus thus calculated, and (d) subsequently calculating a further unsharp mask signal Sus at said predetermined scanning point by averaging the stored basic unsharp mask signals Sus for α1×α2 number of the basic unsharp masks within an unsharp mask having a mask size of α1N×α2M, where α1 and α2 respectively denote an integer excluding 1, and repeating said calculation of the further unsharp mask signal Sus multiple time using different values of α1 and α2.

5. A method as defined in claim 4 wherein N and M are respectively set equal to 3.

6. A method as defined in claim 4 wherein α1 and α2 are set as odd numbers.

7. A method as defined in claim 6 wherein α1 and α2 are set equal to each other.

8. A radiation image displaying apparatus, comprising:

(i) original image signal memory means for storing original image signals Sorg obtained by scanning a recording medium and reading out a radiation image stored at each point thereon, (ii) unsharp masking process means for obtaining an unsharp mask signal Sus corresponding to a super-low frequency at each scanning point, and for conducting an operation represented by the formula $$S' = Sorg + \beta(Sorg - Sus)$$

where $\beta$ denotes an emphasis coefficient, using said unsharp mask signals Sus, said emphasis coefficient $\beta$ and said original image signals Sorg, to perform an unsharp masking process for emphasizing frequency components above said super-low frequency, (iii) control means for sequentially changing the value of at least one of said unsharp mask signal Sus and said emphasis coefficient $\beta$, and for activating said unsharp masking process means to conduct said operation for each of said changed values, and (iv) display means for continuously displaying images based on the image signals S', which images are obtained by conducting said operation using said sequentially changing values, as a moving image.

9. An apparatus as defined in claim 8 wherein said display means comprises frame memory means for storing image signals S' for one image, and D/A converter means for converting of the signals received from said frame memory means.

10. An apparatus as defined in claim 8 wherein said display means comprises frame memory means for storing image signals S' for a plurality of images, address switching means connected to said frame memory means for switching the displayed image, and D/A converter means for D/A converting of the signals received from said address switching means.

11. An apparatus as defined in claim 8 wherein said unsharp masking process means comprises operation means for conducting an operation expressed as Sorg-Sus, memory means for storing the calculated result obtained by said operation means, multiplier means for carrying out an operation expressed as $\beta \times$(Sorg-Sus), and adder means for conducting an operation expressed as Sorg+$\beta$(Sorg-Sus), said multiplier means being connected to said control means, said control means sequentially changing the value of $\beta$.

12. An apparatus as defined in claim 8 wherein said unsharp masking process means comprises operation means for conducting an operation expressed as Sorg-Sus, memory means for storing the calculated result obtained by said operation means, multiplier means for carrying out an operation expressed as $\beta \times$(Sorg-Sus), and adder means for conducting an operation expressed as Sorg+$\beta$(Sorg-Sus), said operation means and said multiplier means being connected to said control means, said control means sequentially changing the values of Sus and $\beta$ respectively.

13. An apparatus as defined in claim 8 wherein said memory means comprises frame memory means for storing the calculated results obtained for a plurality of images, said frame memory means being connected to address switching means for switching the displayed image, and said address switching means being connected to said multiplier means.

14. An apparatus as defined in claim 8 wherein said unsharp masking process means comprises first operation means for calculating a basic unsharp mask signal Sus for a basic unsharp mask having a mask size of N×M, where N and M respectively denote an integer excluding 1, at every scanning point, memory means for storing the respective basic unsharp mask signals Sus, second operation means for calculating an unsharp mask signal Sus for a different mask size by averaging the respective unsharp mask signals Sus in accordance with a command received from said control means, subtracter means for conducting an operation expressed as Sorg-Sus between the unsharp mask signal Sus thus obtained and said original image signal Sorg, multiplier means for carrying out an operation expressed as $\beta$(Sorg-Sus) by multiplying the output of said subtracter means by $\beta$, and adder means for performing an operation expressed as Sorg+$\beta$(Sorg-Sus) by adding said original image signal Sorg to the output of said multiplier means.

15. An unsharp mask signal calculating method for calculating a plurality of unsharp mask signals Sus for use in the processing of image signals obtained in the course of scanning of a recording medium, comprising the steps of:
obtaining an original image signal Sorg at each scanning point,
conducting an operation represented by the formula S'=Sorg+$\beta$(Sorg-Sus)

where Sus denotes an unsharp mask signal corresponding to a super-low frequency at each scanning point and $\beta$ denotes an emphasis coefficient, for each original image signal Sorg, to perform an unsharp masking process, and
performing the unsharp masking process multiple times using different unsharp mask signals Sus sequentially,
said unsharp masking process further comprising the steps of:
(i) setting a rectangular basic unsharp mask having a mask size of N×M where N and M denote the number of scanning points in two respective directions and are arbitrary integers excluding 1,
(ii) disposing said basic unsharp mask so that a predetermined scanning point is positioned at the center thereof, and calculating a basic unsharp mask signal Sus at said predetermined scanning point by averaging original image signals Sorg at all scanning points included in said basic unsharp mask,
(iii) calculating said basic unsharp mask signal Sus at respective scanning points, and storing the respective basic unsharp mask signals Sus thus calculated, and
(iv) subsequently calculating a further unsharp mask signal Sus at said predetermined scanning point by averaging the stored basic unsharp mask signals Sus for $\alpha 1 \times \alpha 2$ number of the basic unsharp masks within an unsharp mask having a mask size of $\alpha 1$N×$\alpha 2$M where $\alpha 1$ and $\alpha 2$ respectively denote an integer excluding 1, and repeating said calculation of the further unsharp mask signal Sus multiple times using different values of $\alpha 1$ and $\alpha 2$.

16. A method as defined in claim 15 wherein N and M are set equal to 3.

17. A method as defined in claim 15 wherein $\alpha 1$ and $\alpha 2$ are set as odd numbers.

18. A method as defined in claim 17 wherein $\alpha 1$ and $\alpha 2$ are set equal to each other.

19. An unsharp mask signal calculating apparatus for calculating unsharp mask signals Sus for use in the processing of an original image signal Sorg obtained at each scanning point of a recording medium, for conducting an operation represented by the formula S'=Sorg+$\beta$(Sorg-Sus)

where Sus denotes an unsharp mask signal corresponding to a super-low frequency at each scanning point and $\beta$ denotes an emphasis coefficient, for each original image signal Sorg, to perform an unsharp masking process, and for performing said unsharp masking process multiple times using different unsharp mask signals Sus sequentially,
the unsharp mask signal calculating apparatus comprising:
(i) first operation means for, when a predetermined scanning point is positioned at the center of a basic unsharp mask having a mask size of N×M where N and M respectively denote the number of scanning points in two respective directions and are arbitrary integers excluding 1, calculating a basic unsharp mask signal Sus at said predetermined scanning point by averaging the original image signal Sorg at all scanning points included in said basic unsharp mask, (ii) memory means for storing the respective basic unsharp mask signals Sus at respective scanning points, as calculated by said first operation means, (iii) second operation means for reading the basic unsharp mask signals Sus for $\alpha१ \times \alpha२$ number of basic unsharp masks within an unsharp mask having a mask size of $\alpha1 N \times \alpha2 M$, where $\alpha1$ and $\alpha2$ respectively denote an integer excluding 1, from said memory means, and calculating a further unsharp mask signal Sus for said predetermined scanning point by averaging said basic unsharp mask signals Sus thus read, and (iv) control means for sending a command to said second operation means for sequentially changing the values of $\alpha1$ and $\alpha2$ and for causing said second operation means to calculate further unsharp mask signals Sus for said respective values of $\alpha1$ and $\alpha2$.

* * * * *